United States Patent
Ono et al.

(10) Patent No.: US 6,776,853 B2
(45) Date of Patent: Aug. 17, 2004

(54) CLEANING METHOD AND METHOD FOR MANUFACTURING LIQUID CRYSTAL DEVICE

(75) Inventors: Yoichi Ono, Shiojiri (JP); Shinji Hashikura, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/899,758

(22) Filed: Jul. 5, 2001

(65) Prior Publication Data

US 2002/0135730 A1 Sep. 26, 2002

(30) Foreign Application Priority Data

Jul. 6, 2000 (JP) ........................................ 2000-205228

(51) Int. Cl.[7] .................................................. B08B 3/04
(52) U.S. Cl. ................................ 134/30; 134/2; 134/21; 134/22.1; 134/22.18; 134/22.19; 134/23; 134/25.4; 134/26; 134/32; 134/34; 134/36; 134/42; 134/902; 510/175; 510/245; 510/254; 510/273; 510/421
(58) Field of Search ........................ 134/2, 21, 22.1, 134/22.18, 22.19, 23, 25.4, 30, 26, 32, 34, 36, 42, 902; 570/175, 245, 254, 223, 421

(56) References Cited

U.S. PATENT DOCUMENTS

| | | | | |
|---|---|---|---|---|
| 3,003,247 A | * | 10/1961 | Sherliker | 34/340 |
| 3,085,918 A | * | 4/1963 | Sherliker et al. | 134/30 |
| 3,714,075 A | * | 1/1973 | Johnson | 508/291 |
| 3,822,213 A | * | 7/1974 | Johnson | 510/417 |
| 5,464,477 A | * | 11/1995 | Awad | 134/1 |
| 6,355,113 B1 | * | 3/2002 | Nalewajek et al. | 134/26 |
| 2002/0135730 A1 | * | 9/2002 | Ono et al. | 349/187 |

FOREIGN PATENT DOCUMENTS

JP 09-263791 * 10/1997

* cited by examiner

Primary Examiner—Frankie L. Stinson
(74) Attorney, Agent, or Firm—Harness, Dickey & Pierce, P.L.C.

(57) ABSTRACT

In a cleaning apparatus 500, as a pre-cleaning step, cleaning is performed in a first and a second backup cleaning bath 602 and 603 using a hydrocarbon-based cleaning liquid composed of a normal paraffin, such as normal nonane or normal decane, as a primary component and a surfactant such as a fatty acid alkanol amide or a fatty acid N-alkyl alkylene diamine, and as a post-cleaning step, immersion cleaning, shower cleaning, and vapor cleaning are performed in a cleaning bath 601 using a hydrocarbon-based cleaning liquid containing no surfactant.

7 Claims, 11 Drawing Sheets

CLEANING LIQUID

LIQUID LEVEL OF CLEANING LIQUID

CLEANING METHOD AND METHOD FOR MANUFACTURING LIQUID CRYSTAL DEVICE

BACKGROUND OF THE INVENTION

1. Technical Field of the Invention

The present invention relates to methods for cleaning works such as liquid crystal panels and relates to methods for manufacturing liquid crystal devices using the cleaning methods.

2. Description of the Related Art

When a liquid crystal device used as a display device is manufactured, after a panel is formed by bonding two substrates, liquid crystal is enclosed between the substrates by vacuum injection or the like. Next, after an inlet formed in the panel for injecting the liquid crystal therein is sealed, or after the panel is formed by cutting, the panel is cleaned so as to remove liquid crystal adhered to surfaces of the panel and is then connected to a flexible circuit substrate or the like by using an anisotropic conductive film.

As a cleaning liquid used for the cleaning described above, fluorinated cleaning liquids may be given as examples; however, since the fluorinated cleaning liquids cause destruction of the ozone layer, the usage thereof tends to be restricted or banned. Accordingly, in place of the fluorinated cleaning liquids, hydrocarbon-based cleaning liquids are gradually being used.

Hydrocarbon-based cleaning liquids can remove organic impurities; however, there is a problem in that the hydrocarbon-based liquids cannot sufficiently remove inorganic impurities. There may be a method for removing inorganic impurities by employing water cleaning in combination with cleaning using a hydrocarbon-based liquid; however, when water cleaning is employed, there are problems in that cost for a waste water treatment is high and in that a drying step takes a long period of time.

Accordingly, a method for cleaning both organic and inorganic impurities by using a hydrocarbon-based cleaning liquid containing a surfactant may be considered; however, when the cleaning liquid mentioned above is used, there is a problem in that a surfactant remaining on the liquid crystal panel after cleaning may have adverse influence in some cases.

In consideration of the problems described above, an object of the present invention is to provided a cleaning method in which both organic and inorganic impurities can be sufficiently removed from a work and in which a surfactant does not remain thereon, even when cleaning is performed by using a hydrocarbon-based cleaning liquid, and is to provide a method for manufacturing a liquid crystal device using the cleaning method described above.

SUMMARY OF THE INVENTION

In order to solve the problems described above, a cleaning method according to the present invention comprises a pre-cleaning step of performing at least immersion cleaning for a work by using a hydrocarbon-based cleaning liquid containing a surfactant; and a post-cleaning step of performing at least immersion cleaning for the work processed in the pre-cleaning step using a hydrocarbon-based cleaning liquid containing no surfactant; wherein, in the post-cleaning step, an operation of evacuating the inside of a cleaning bath and an operation of exposing the inside of the cleaning bath to air are repeated while the work is being immersed in the cleaning liquid.

In the present invention, after organic or inorganic impurities are removed by cleaning the work using the hydrocarbon-based cleaning liquid containing the surfactant (a pre-cleaning step), the work is cleaned by using the hydrocarbon-based cleaning liquid containing no surfactant, thereby cleaning out the hydrocarbon-based cleaning liquid containing the surfactant adhered to the work (post-cleaning step).

In addition, since in the post-cleaning step, the operation of evacuating the inside of the cleaning bath and the operation of exposing the inside thereof to air are repeatedly performed while the work is immersed in the cleaning liquid, during evacuation, bubbles grow and combine with each other in spaces of the liquid crystal panels and spaces between the liquid crystal panels so as to form larger bubbles and then escape from the spaces. Accordingly, the cleaning liquid smoothly infiltrates into the spaces, and hence, the hydrocarbon-based cleaning liquid containing the surfactant present in the spaces can be thoroughly replaced by the hydrocarbon-based cleaning liquid containing no surfactant. As a result, after the cleaning is performed, the organic and the inorganic impurities can be thoroughly removed from the work, and in addition, the surfactant contained in the hydrocarbon-based cleaning liquid used in the pre-cleaning step does not remain on the work.

In the present invention, the work is preferably brought out from the cleaning liquid while being inclined in at least one of the pre-cleaning step and the post-cleaning step. When the work is brought out in a manner as described above, a cleaning liquid, which does not flow out from the work in a normal position, flows out from the work. Consequently, an amount of the cleaning liquid adhered to the work brought out can be significantly decreased.

In the present invention, the work is preferably brought out from the cleaning liquid while being moved up and down in at least one of the pre-cleaning step and the post-cleaning step. When the work is brought out in a manner described above, a polluted cleaning liquid present in the spaces of the works and present therebetween can be thoroughly replaced by a cleaning liquid stored in the cleaning bath.

In the present invention, a step of drying the work is preferably performed between the pre-cleaning step and the post-cleaning step. When the step of drying is performed as described above, since the post-cleaning can be performed after the cleaning liquid present in the spaces of the works and spaces therebetween is removed, when the post-cleaning step is performed, the cleaning liquid smoothly infiltrates into the spaces of the works and spaces therebetween, whereby the post-cleaning can be satisfactory performed.

The cleaning method of the present invention can be applied to, for example, cleaning of liquid crystal panels each enclosing liquid crystal therein as the works. That is, when at least one substrate of a pair of substrates constituting the liquid crystal panel is a soda glass substrate, even though the soda glass substrate is inexpensive, there is a shortcoming in that alkali metals contained therein are precipitated on surfaces of the glass and then form the salts thereof. However, in the present invention, since the inorganic materials described above are cleaned out by the cleaning liquid containing a surfactant, according to the present invention, the problem of the glass substrate in that the salts composed of the alkali metals precipitated on the surfaces thereof cause corrosion can be solved.

The present invention is more effectively applied to the case in which cleaning is performed when a plurality of liquid crystal panels are placed adjacent to each other. In the present invention, since an evacuated state and a state at an atmospheric pressure are repeatedly performed while the liquid crystal panels are immersed in the cleaning liquid in the post-cleaning step, during the evacuated state, bubbles grow and combine with each other so as to for larger bubbles and escape from the spaces. Consequently, since the cleaning liquid smoothly infiltrates into the spaces of the liquid crystal panels and spaces therebetween, the cleaning liquid containing the surfactant present in the spaces of the liquid crystal panels and spaces therebetween can be thoroughly replaced by the cleaning liquid containing no surfactant. As a result, after the cleaning is performed, organic and inorganic impurities can be thoroughly removed from the liquid crystal panels, and in addition, the surfactant contained in the cleaning liquid used in the pre-cleaning step does not remain thereon.

DETAILED DESCRIPTION OF THE PREFERRED EMBODIMENTS

Referring to accompanying figures, embodiments of the present invention will be described. In this connection, prior to the descriptions of the individual embodiments of the present invention, the structure of a liquid crystal panel, which is an object (work) to be cleaned, and a manufacturing method therefor will be described.

Figure 1:
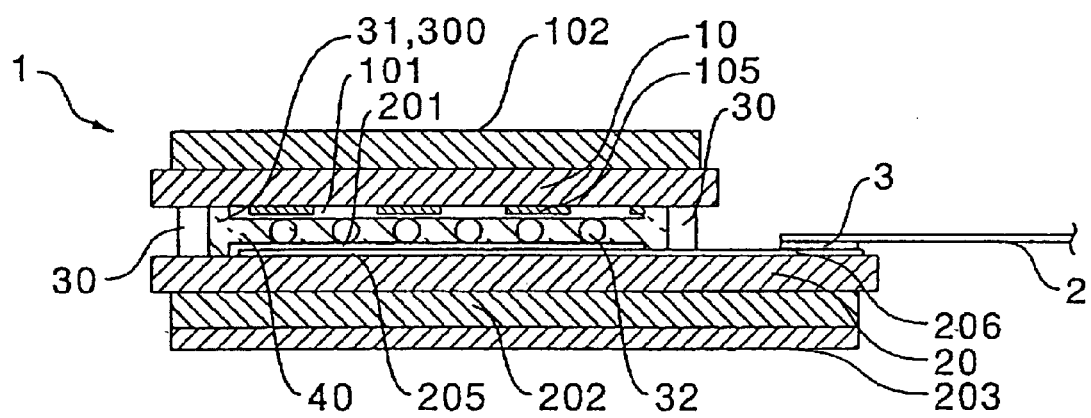
FIG. 1 is a vertical cross-sectional view showing the structure of a liquid crystal panel for use in a liquid crystal device.
Figure 2:
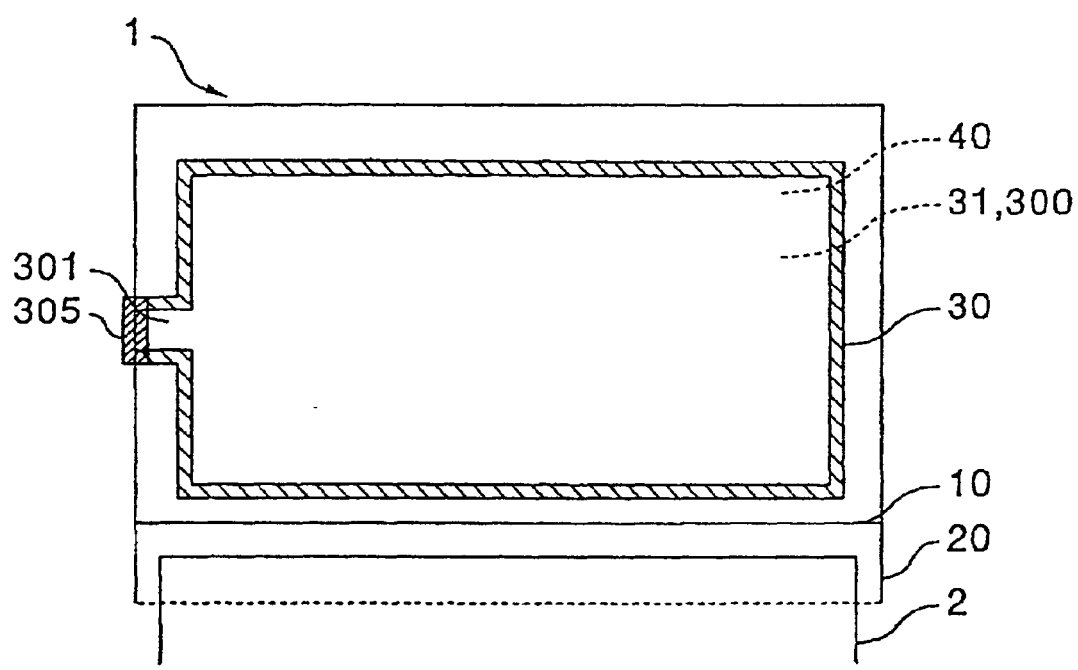
FIG. 2 is a plan view of the liquid crystal panel shown in FIG. 1.
Figure 3:
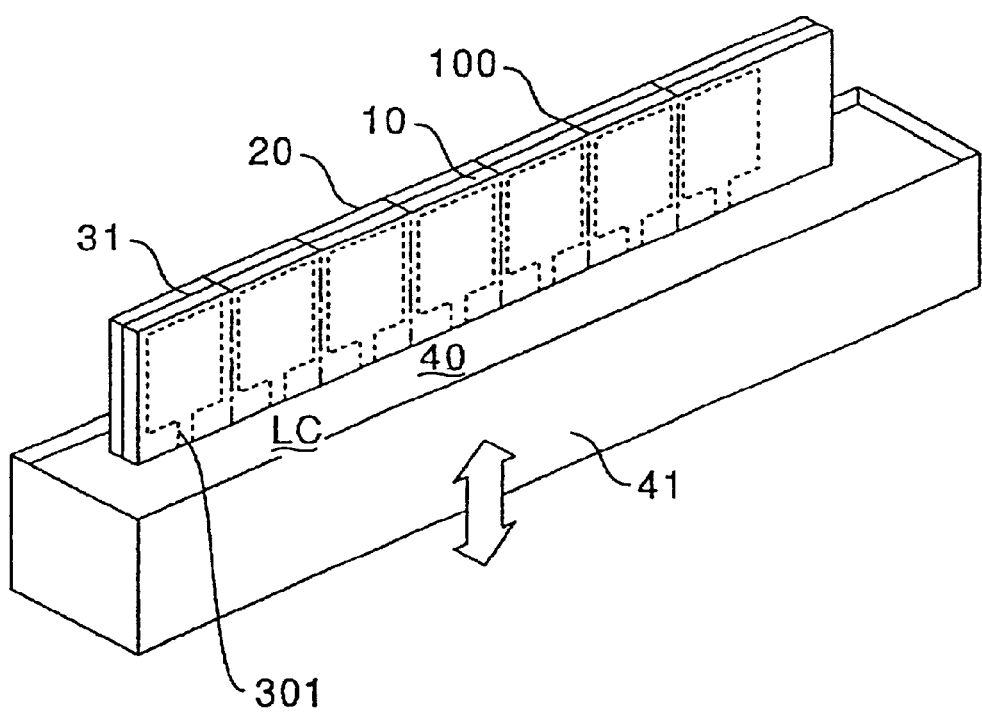
FIG. 3 is a view showing a method for injecting liquid crystal between the substrates in a liquid crystal injection step among steps of manufacturing the liquid crystal panel shown in FIG. 1.

FIGS. 1 and 2 are a vertical cross-sectional view and a plan view showing the structure of a liquid crystal panel for use in a liquid crystal display device (a liquid crystal device), respectively. FIG. 3 is a view illustrating a vacuum injection step of injecting liquid crystal in the liquid crystal panel.

A liquid crystal panel 1 shown in FIG. 1 is used for a simple matrix type liquid crystal device and comprises a thin first transparent substrate 10 composed of glass and a thin second transparent substrate 20 also composed of glass. On one of these transparent substrates, a sealing material 30 is formed by printing or the like, and the first transparent substrate 10 and the second transparent substrate 20 are fixed by bonding using the sealing material 30 provided therebetween so as to have a predetermined gap 31 (a cell gap) therebetween. In this connection, the cell gap formed between the first transparent substrate 10 and the second transparent substrate 20 is defined by a plurality of spacers 32 provided between the first transparent substrate 10 and the second transparent substrate 20.

As shown in FIG. 2, in the sealing material 30, a cutaway portion is formed which is used as an inlet 301 for liquid crystal injection, and this inlet 301 is sealed by an encapsulating material 305 composed of a UV curable resin.

Again referring to FIG. 1, in the gap 31 formed between the first transparent substrate 10 and the second transparent substrate 20, an area 300 enclosing liquid crystal defined by the sealing material 30 encloses liquid crystal 40. On surfaces of stripe-shaped electrodes 105 and 205 formed on surfaces opposing each other of the first transparent substrate 10 and the second transparent substrate 20, alignment films 101 and 201 are formed, respectively, and the liquid crystal 40 is driven by an STN (Super Twisted Nematic) method.

To the outside surfaces of the first transparent substrate 10 and the second transparent substrate 20, polarizers 102 and 202 are adhered, respectively. In this connection, when the liquid crystal panel 1 is formed so as to be a reflective liquid crystal panel 1, a reflector 203 is adhered to the polarizer 202 adhered to the second transparent substrate 20.

On the inside surface of the first transparent substrate 10, a plurality of stripe-shaped electrodes 105 extending in the lateral direction is formed by using, for example, ITO (Indium Tin Oxide) films, and on the inside surface of the second transparent substrate 20, a plurality of stripe-shaped electrodes 205 extending in the longitudinal direction is formed by using ITO films. At each crossing of the stripe-shaped electrodes 105 and 205, a pixel is formed. Since the second transparent substrate 20 is larger than the first transparent substrate 10, a part of the second transparent substrate 20 protrudes from the lower edge line of the first transparent substrate 10, and to terminals 206 formed on an end area of the protruding portion, a flexible circuit substrate 2 is connected with anisotropic conductive films 3 or the like provided therebetween. For example, the terminals 206 are composed of wires (extension) formed of stripe-shaped electrodes 205 provided on the protruding portion of the second transparent substrate 20 and wires which are formed on the protruding portion and which are electrically connected to the stripe-shaped electrodes 105 formed on the first transparent substrate via a conductive material (not shown in the figure) so that the first transparent substrate 10 and the second transparent substrate 20 are electrically connected to each other. The terminals 206 thus formed are aligned and are used for electrical connection. Accordingly, when various control signals or driving signals of a power supply source or the like are input to the terminals 206 from external circuits via the flexible circuit substrate 2, a voltage can be applied to predetermined and optional stripe-shaped electrodes 105 and 205 in accordance with the driving signal described above. As a result, an alignment of the liquid crystal 40 at each pixel can be controlled, and hence, a desired image can be displayed on the liquid crystal panel 1.

In a method for manufacturing the liquid crystal panel 1 described above, in the course of manufacturing, two large substrates are used in which a plurality of first substrates and a plurality of second substrates are formed, respectively. The stripe-shaped electrodes 105 and 205 are formed on the two large substrates, respectively, and the two large substrates having the first transparent substrates 10 and the second transparent substrates 20 formed therein are then bonded to each other with the sealing material 30 provided therebetween. After the large substrates are bonded together, they are cut into stripes, and a liquid crystal injection step shown in FIG. 3 is then performed.

In FIG. 3, when the liquid crystal injection step is performed, the inlets 301 for liquid crystal injection are provided in the cut portion of the stripe-shaped panel 100 at areas at which the liquid crystal panels 1 are formed. Subsequently, after the stripe-shaped panel 100 is placed in a process chamber of a liquid crystal injection apparatus, the inside of the process chamber is evacuated, a container 41 storing the liquid crystal 40 is elevated under the evacuated condition described above so that the inlets 301 for liquid crystal injection are immersed in the liquid crystal 40, and in the state described above, the inside of the process chamber is exposed to air so as to break the evacuated condition. As a result, since each gap 31 formed between the first transparent substrate 10 and the second substrate 20 remains evacuated, the liquid crystal 40 is sucked into the gaps 31 through the inlets 301 for liquid crystal injection.

After the injection of the liquid crystal 40 is completed as described above, as described with reference to FIG. 2, the inlets 301 for liquid crystal injection are sealed by the encapsulating material 305 composed of a UV curable resin.

After the steps of injection of the liquid crystal 40 and sealing are completed as described above, or after a plurality of single liquid crystal panels 1 are formed by cutting the stripe-shaped panel 100, liquid crystal adhered to the panel or powdered glass adhered thereto during cutting is removed by cleaning.

Figure 4:
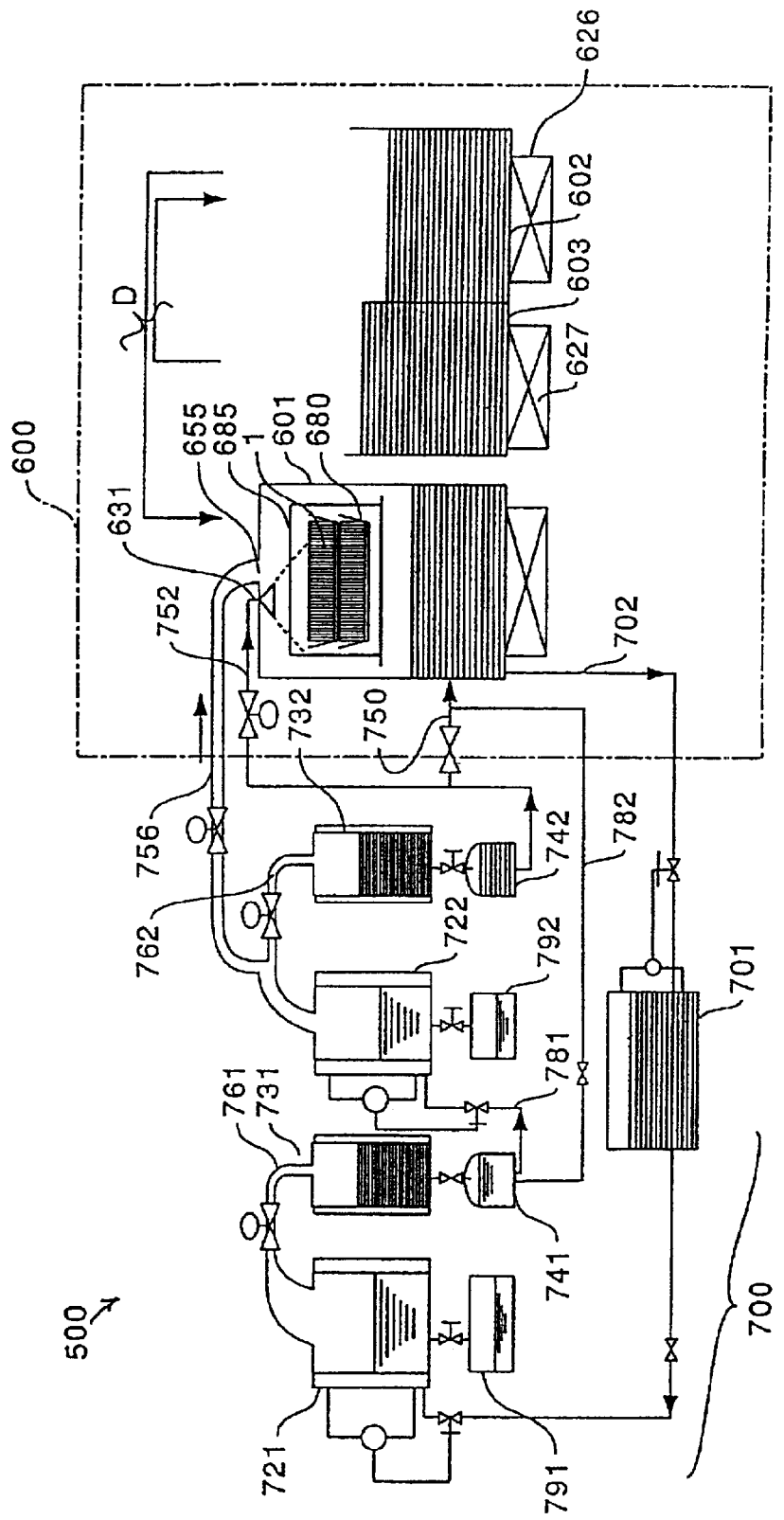
FIG. 4 is a block diagram showing the entire structure of a cleaning apparatus provided with a distillation/recycling function for performing a cleaning method of the present invention.
Figure 5:
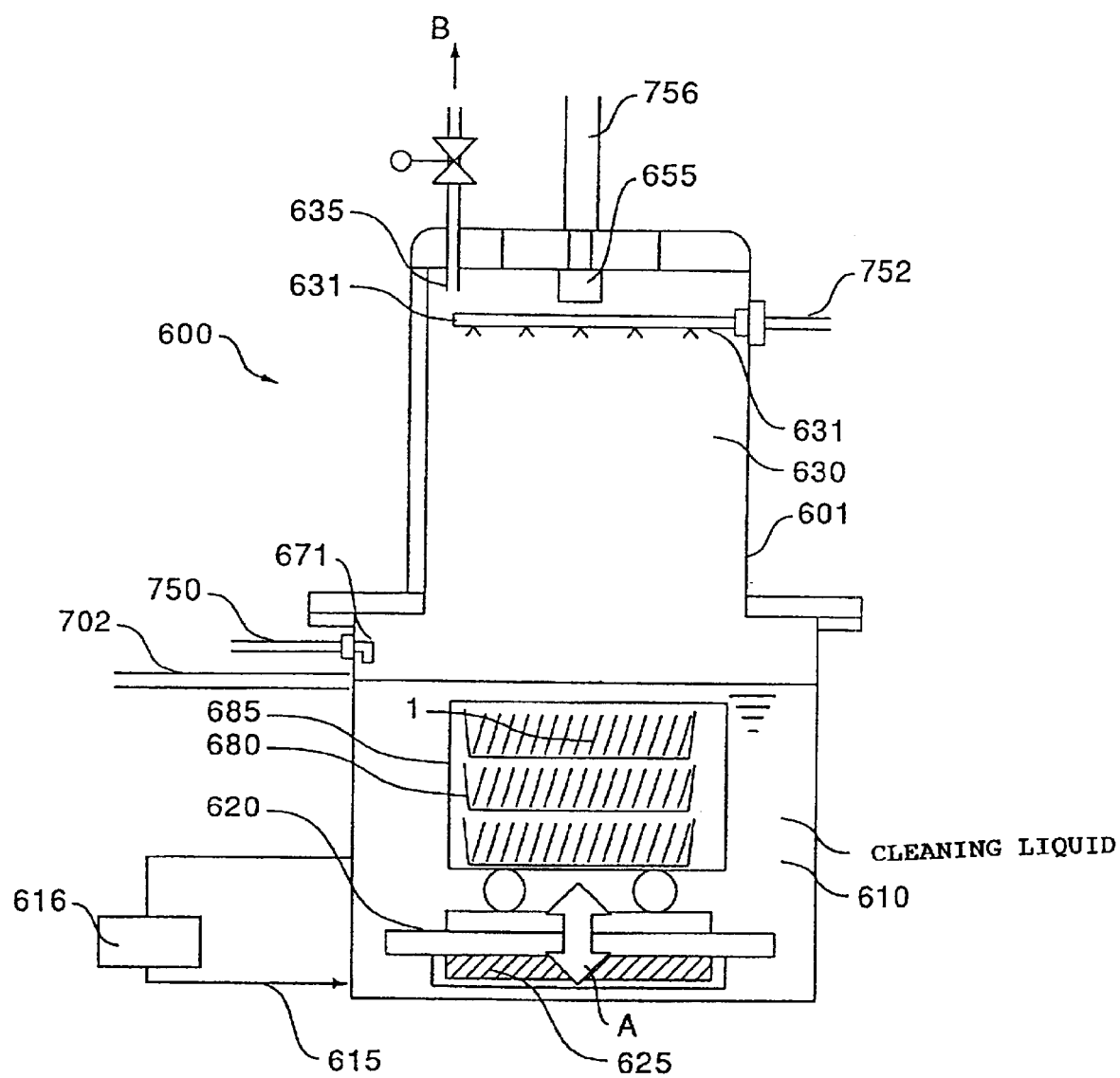
FIG. 5 is a view for illustrating a state in which immersion cleaning is performed by the cleaning apparatus provided with the distillation/recycling function shown in FIG. 4.
Figure 6:
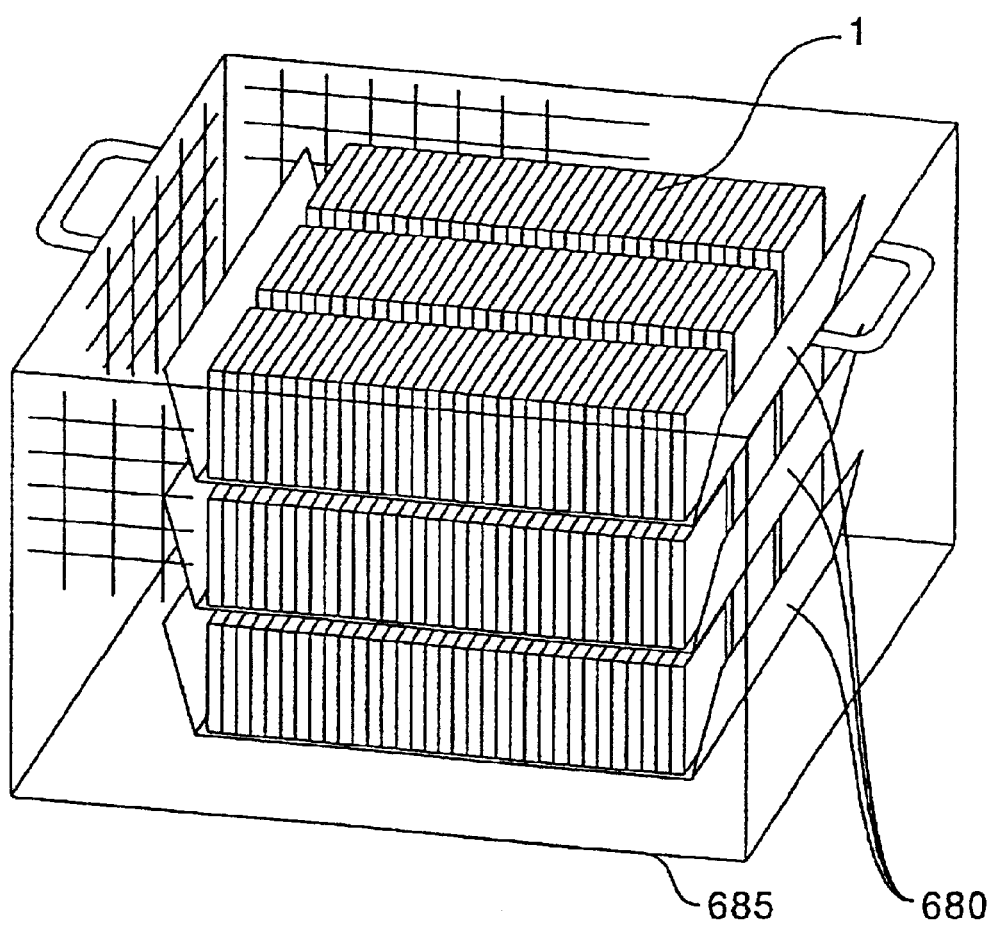
FIG. 6 is a view for illustrating holders used for cleaning liquid crystal panels by the cleaning apparatus provided with the distillation/recycling function shown in FIG. 4.

FIG. 4 is a block diagram showing the entire structure of a cleaning apparatus provided with a distillation/recycling function for performing the cleaning method according to the present invention. FIG. 5 is a view for illustrating a state in which immersion cleaning is performed using the cleaning apparatus provided with the distillation/recycling function shown in FIG. 4. FIG. 6 is view for illustrating holders used for cleaning the liquid crystal panels by the cleaning apparatus provided with the distillation/recycling function shown in FIG. 4.

Figure 7:
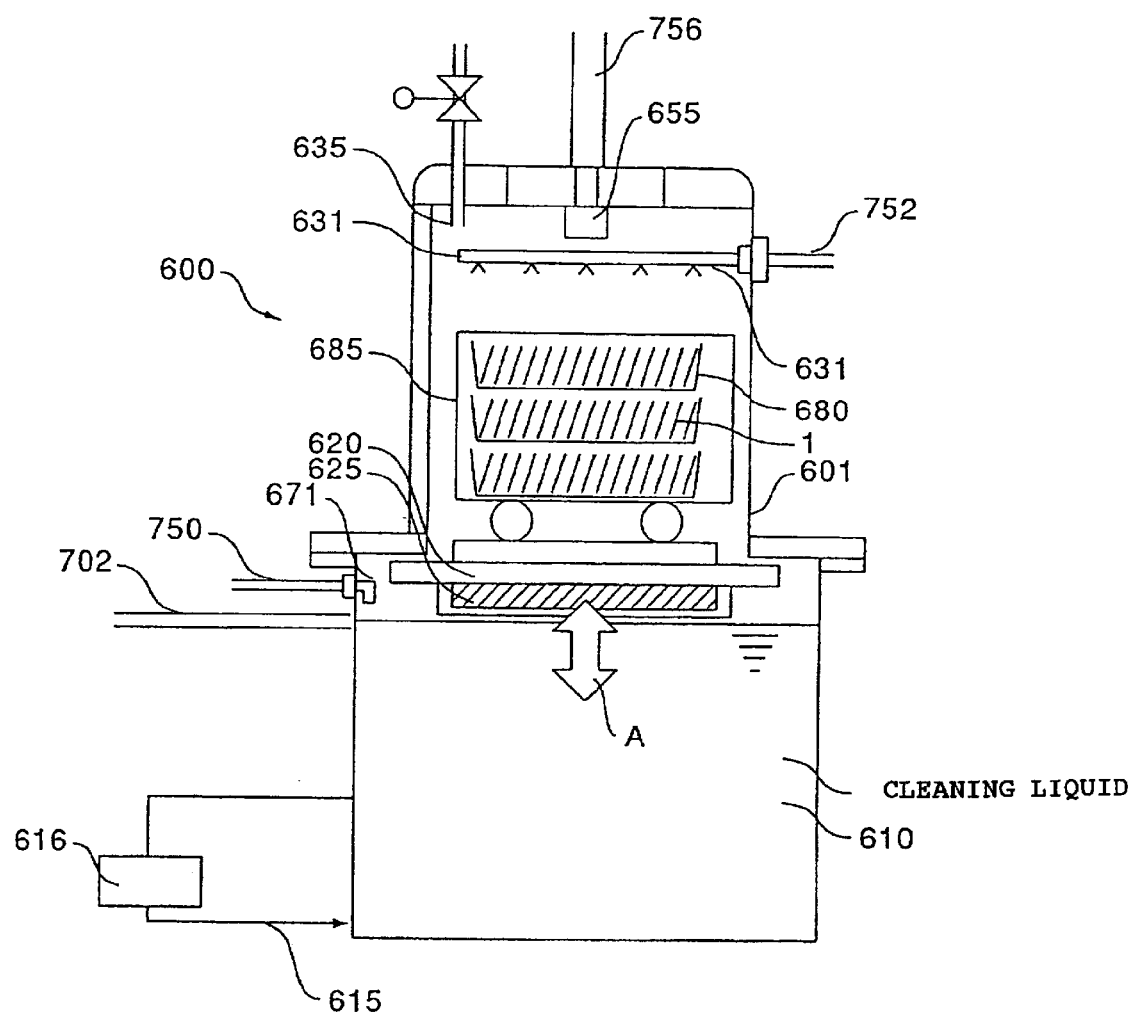
FIG. 7 is a view for illustrating a state in which shower cleaning and vapor cleaning are performed by the cleaning apparatus provided with the distillation/recycling function shown in FIG. 4.
Figure 8:
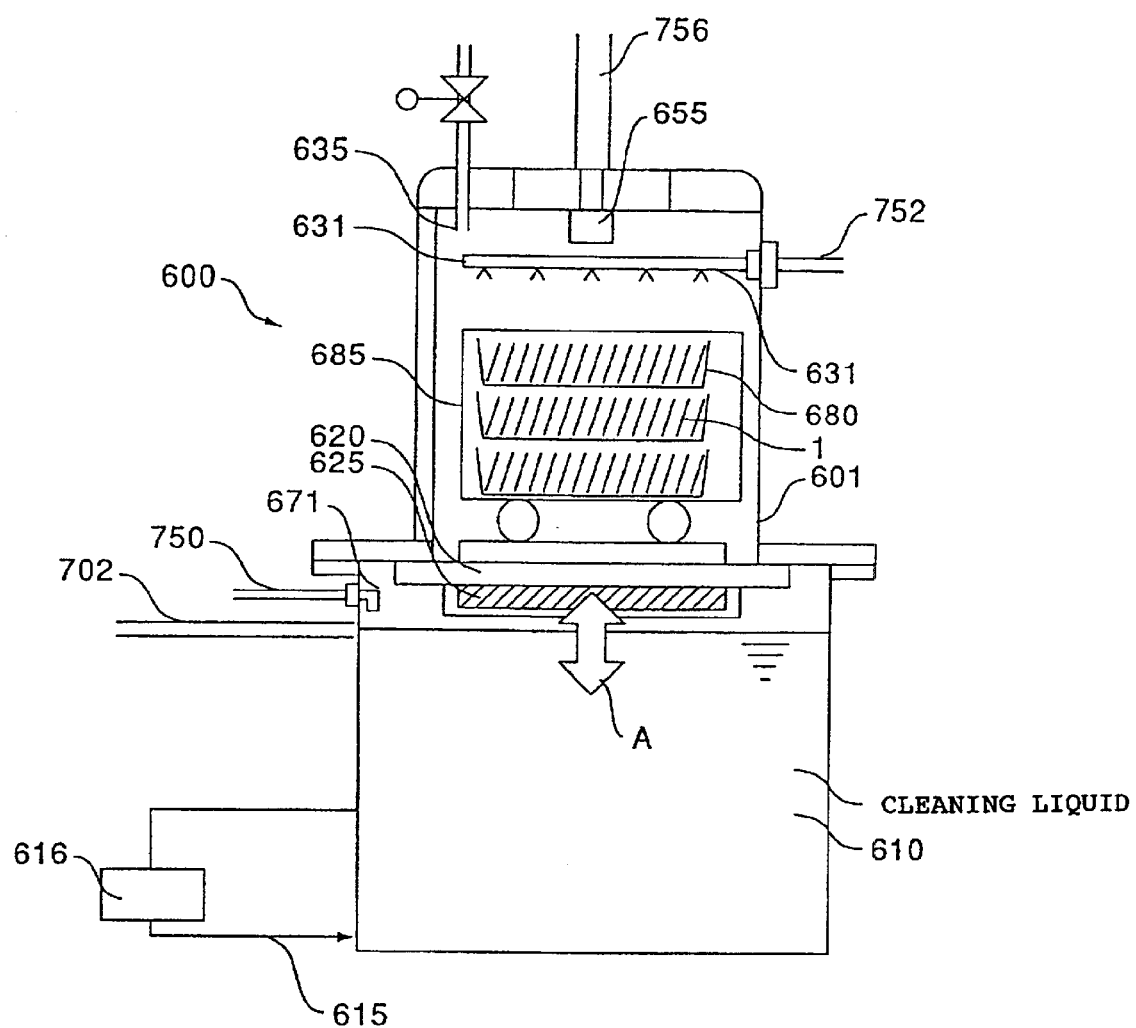
FIG. 8 is a view for illustrating a state in which a drying step is performed by the cleaning apparatus provided with the distillation/recycling function shown in FIG. 4.

FIG. 7 is a view for illustrating a state in which shower cleaning and vapor cleaning are performed using the cleaning apparatus provided with the distillation/recycling function shown in FIG. 4. FIG. 8 is a view for illustrating a state in which a drying step is performed using the cleaning apparatus provided with the distillation/recycling function shown in FIG. 4.

In FIG. 4, a cleaning apparatus 500 (hereinafter referred to as a cleaning apparatus 500) provided with a distillation/recycling function according to this embodiment is substantially composed of a cleaning portion 600 for cleaning works such as the liquid crystal panels 1 and a distillation/recycling portion 700 for recycling a cleaning liquid used in this cleaning portion 600 by distillation.

In the cleaning portion 600 of this cleaning apparatus 500, a first backup cleaning bath 602 provided with an ultrasonic oscillator 626 and a second backup cleaning bath 603 provided with an ultrasonic oscillator 627 are first disposed, and a pre-cleaning step is performed by these two backup cleaning baths 602 and 603. The first backup cleaning bath 602 and the second backup cleaning bath 603 are integrally formed and are designed so that a cleaning liquid overflows from the second backup cleaning bath 603 to the first backup cleaning bath 602.

In the first backup cleaning bath 602 and the second backup cleaning bath 603, a hydrocarbon-based cleaning liquid is stored which is composed of a normal paraffin, such as normal nonane or normal decane, as a primary component and a surfactant as an additive. The surfactant described above is, for example, a fatty acid alkanol amide, or a fatty acid N-alkyl alkylene diamine, and the additive described above is added at a content of, for example, 5 wt % or less, in this embodiment, as the additives, a fatty acid alkanol amide represented by the formula shown below,

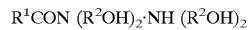

(in which $R^1$ and $R^2$ are alkyl groups), and a fatty acid N-alkyl alkylene diamine represented by the formula shown below.

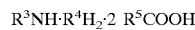

(in which $R^3$ and $R^5$ are alkyl groups, and $R^4$ is an alkylene group) are added at a content of 5 wt % or less, respectively.

In addition, in the cleaning portion 600, a cleaning bath 601 for performing a post-cleaning step is disposed. The structure of the cleaning bath 601 will be described later together with a plumbing structure from the distillation/recycling portion 700, and a cleaning liquid used in the cleaning bath 601 is a hydrocarbon-based cleaning liquid primarily composed of normal nonane, normal decane, or the like. However, a surfactant is not added to this cleaning liquid.

In addition, in the cleaning portion 600, a robot (indicated by arrow D) is disposed for conveying cleaning basket 685 mounting the liquid crystal panels 1 which are objectives to be cleaned (works) to the first backup cleaning bath 602, the second backup cleaning bath 603, and the cleaning bath 601 in this order.

In the distillation/recycling portion 700, a control bath 701 is disposed for recovering a cleaning liquid overflowing from the cleaning bath 601 via a discharge pipe 702 for discharging a cleaning liquid, and distillation/recycling devices for recycling the cleaning liquid supplied from the control bath 701 by distillation have a multi-stage structure. That is, in the distillation/recycling portion 700, a first-stage distillation/recycling device 721 (an initial stage) and a second-stage distillation/recycling device 722 (a last stage) are communicated with each other in series, in which a cleaning liquid is supplied to the first-stage distillation/recycling device 721 from the control bath 701, and a cleaning liquid recycled in the distillation/recycling device 721 by distillation is recycled in the second-stage distillation/recycling device 722 by distillation.

In addition, the individual distillation/recycling devices 721 and 722 are provided with condensers 731 and 732 for liquefying vapor evaporated in the distillation/recycling devices and intermediate baths 741 and 742 for storing recycled cleaning liquid liquefied in these condensers 731 and 732, respectively.

The first-stage distillation/recycling device 721 and the first-stage intermediate bath 741 are communicated with each other via the condenser 731 and a discharge pipe 761 for discharging a recycled cleaning liquid provided with a valve, and the first-stage intermediate bath 741 and the second-stage distillation/recycling device 722 are communicated with each other via a supply pipe 781 for supplying a recycled cleaning liquid provided with a valve. Accordingly, a recycled cleaning liquid recycled in the first-stage distillation/recycling device 721 can be supplied to the second-stage distillation/recycling device 722 via the intermediate bath 741.

In addition, the second-stage distillation/recycling device 722 and the second-stage intermediate bath 742 are communicated with each other via the condenser 732 and a discharge pipe 762 for discharging a recycled cleaning liquid provided with a valve.

Furthermore, in this embodiment, below the distillation/recycling devices 721 and 722, receiving baths 791 and 792 are disposed, respectively, which receive cleaning liquids or residues discharged from the distillation/recycling devices.

In the cleaning apparatus 500 thus formed, the first-stage intermediate bath 741 is communicated with the cleaning bath 601 via a supply pipe 782 for supplying an immersion cleaning liquid provided with a valve, and the cleaning liquid recycled by distillation in the first-stage distillation/recycling device 721 can be supplied to the cleaning bath 601 as a cleaning liquid used for immersion cleaning.

The second-stage intermediate bath 742 is communicated with the cleaning bath 601 via a supply pipe 752 for supplying a shower cleaning liquid provided with a valve, and the cleaning liquid recycled by distillation in the second-stage distillation/recycling device 722 can be supplied to the cleaning bath 601 as a shower cleaning liquid. In addition, the second-stage intermediate bath 742 is communicated with the cleaning bath 601 via a supply pipe 750 for supplying an immersion cleaning liquid provided with a valve, and the cleaning liquid recycled by distillation in the second-stage distillation/recycling device 722 can be supplied to the cleaning bath 601 as a immersion cleaning liquid. Furthermore, the second-stage distillation/recycling device 722 is communicated with the cleaning bath 601 via a vapor supply pipe 756 for supplying cleaning liquid vapor provided with a valve, and the cleaning liquid vapor can be supplied to the cleaning bath 601.

In FIG. 5, a supply inlet 671 for supplying a cleaning liquid is disposed at an approximately intermediate position in the height direction of the cleaning bath 601 disposed in the cleaning portion 600, and the supply pipes 750 and 782 for supplying an immersion cleaning liquid are communicated with the supply inlet 671. In the cleaning bath 601, the discharge pipe 702 for discharging a cleaning liquid is provided in order to maintain the level of the cleaning liquid, and hence, the level of the cleaning liquid can be maintained by overflowing the cleaning liquid in the cleaning bath 601 to the control bath 701 (see FIG. 4) via the discharge pipe 702 for discharging a cleaning liquid.

When the works (the liquid crystal panels 1) are cleaned in the cleaning apparatus 500 thus formed, for example, holders 680 shown in FIG. 6 are used. In the case in which the liquid crystal panels 1 are cleaned using the holders 680, the holders 680 mounting the liquid crystal panels placed adjacent to each other are stacked one on the other and are placed in the cleaning basket 685. Accordingly, two to five thousand of the liquid crystal panels 1 can be placed in one cleaning basket 685, and a cleaning step can be simultaneously performed for all of them; however, as a result, there are almost no spaces between the liquid crystal panels 1.

In this embodiment, when the liquid crystal panels 1 are cleaned in the cleaning bath 601 shown in FIG. 5, the cleaning basket 685 is placed on a work table 620 in a immersion cleaning chamber 610 which is formed in the lower half of the cleaning bath 601. Since a hydrocarbon-based cleaning liquid containing no surfactant is stored in this immersion cleaning chamber 610, when the cleaning basket 685 is placed on the work table 620 in the immersion cleaning chamber 610, the liquid crystal panels 1 in the cleaning basket 685 are immersed in the cleaning liquid.

Under the work table 620, an ultrasonic oscillator 625 integral therewith is disposed. In addition the work table 620 is joined with an elevator mechanism (shown by arrow A), and the elevator mechanism can move the work table 620 up and down together with the ultrasonic oscillator 625. Furthermore, for the immersion cleaning chamber 610, a circulation path 615 for the cleaning liquid stored therein is provided, and at a halfway of this circulation path 615, a cooler 616 is provided.

In this embodiment, at the upper half of the cleaning bath 601, a process chamber 630 smaller than the immersion cleaning chamber 610 is formed. In this process chamber 630, a shower nozzle 631 is provided for jetting a cleaning liquid downward for rinsing, and in addition, a vapor nozzle 655 is also provided for jetting cleaning liquid vapor downward for rinsing.

In addition, in a wall surface of the process chamber 630, an outlet 635 is provided which communicates with an evacuation device (shown by arrow B), and the inside of the process chamber 630 can be evacuated via this outlet 635. Furthermore, in the cleaning bath 601, when the elevator mechanism lifts up the work table 620 from the position shown in FIG. 5 to the position shown in FIG. 8, the work table 620 substantially separates the immersion cleaning chamber 610 located at the lower half from the process chamber 630 located at the upper half. Consequently, in the state described above, the cleaning liquid vapor from the immersion cleaning chamber 610 does not come into the process chamber 630, and when evacuation is performed via the outlet 635, a vacuum state can be obtained in the process chamber 630.

In this embodiment, in order to clean the liquid crystal panels 1 in the cleaning apparatus 500, first, the liquid crystal panels 1 mounted in the cleaning basket 685 are immersed in the cleaning liquid (hydrocarbon-based cleaning liquid containing a surfactant) stored in the first backup cleaning bath 602 so as to be processed by ultrasonic cleaning (immersion cleaning) and then immersed in the cleaning liquid (hydrocarbon-based cleaning liquid containing a surfactant) stored in the second backup cleaning bath 603 so as to be processed by ultrasonic cleaning (immersion cleaning).

After the pre-cleaning step is performed as described above, the cleaning basket 685 is placed on the work table 620 in the immersion cleaning chamber 610 of the cleaning bath 601, and the liquid crystal panels 1 are immersed in the cleaning liquid (hydrocarbon-based cleaning liquid containing no surfactant).

Next, evacuation and introduction of air are repeatedly performed via the outlet 635, that is, an evacuated state in the immersion cleaning chamber 610 at $6.67 \times 10^3$ to $13.33 \times 10^3$ Pa (50 to 100 Torr) and a state at an approximately atmospheric pressure are repeatedly formed.

Next, while the inside of the immersion cleaning chamber 610 is placed in a state at an approximately atmospheric pressure, the ultrasonic oscillator 625 is started, whereby immersion cleaning (ultrasonic cleaning) is performed by applying ultrasonic vibration to the liquid crystal panels 1 via the cleaning liquid.

Subsequently, after a predetermined time elapses, the ultrasonic oscillator 625 is stopped, and again, evacuation and introduction of air via the outlet 635 are repeatedly performed, that is, an evacuated state in the immersion cleaning chamber 610 and a state at an approximately atmospheric pressure are repeatedly formed.

Next, while the inside of the immersion cleaning chamber 610 is placed in a state of an atmospheric pressure, the ultrasonic oscillator 625 is started, whereby immersion cleaning (ultrasonic cleaning) is performed by applying ultrasonic vibration to the liquid crystal panels 1 via the cleaning liquid.

The cycle described above are repeatedly performed a predetermined number of times, whereby immersion cleaning (ultrasonic cleaning) is performed.

When the ultrasonic cleaning is performed as described above, in this embodiment, the cleaning liquid is heated to, for example, 50 to 80° C., as long as the influence on the objectives to be cleaned and the loss of the cleaning liquid may not be a problem, so as to decrease the viscosity of impurities and to increase the permeability of the cleaning liquid, whereby the cleaning capability is improved. In addition, temperature control is performed by the cooler 616 for cooling the cleaning liquid, and as a result, overheating of the cleaning liquid caused by ultrasonic waves can be avoided. By the temperature control described above, even when a flammable cleaning liquid is used, the temperature can be controlled at approximately 10° C. below the flash point thereof.

In this connection, while ultrasonic vibration is applied to the liquid crystal panels 1 by operating the ultrasonic oscillator 625, evacuation and introduction of air may be repeatedly performed via the outlet 635, that is, an evacuated state in the immersion cleaning chamber 610 and a state at an approximately atmospheric pressure may be repeatedly performed.

Next, the elevator mechanism is started so that the work table 620 is lifted from the position shown in FIG. 5 to the position shown in FIG. 7, and in a state in which the immersion cleaning chamber 610 at the lower half and the process chamber 630 at the upper half are not substantially separated from each other, a cleaning liquid is first jetted from the spray nozzle 631, whereby a first rinsing is performed.

Subsequently, the insides of the immersion cleaning chamber 610 and the process chamber 630 are placed in an evacuated state of $6.67\times10^3$ to $13.33\times10^3$ Pa (50 to 100 Torr) by evacuation via the outlet 635, and cleaning vapor is supplied therein from the distillation/recycling device 722 via the vapor supply pipe 756 and the vapor nozzle 655, whereby vapor cleaning (second rinsing) is performed for the liquid crystal panels 1.

Next, while the inside of the cleaning bath 601 is returned to a state an atmospheric pressure, cleaning liquid vapor is jetted therein from the vapor nozzle 655, whereby vapor cleaning is performed for the liquid crystal panels 1 (third rinsing).

After rinsing was performed as described above, the work table 620 was lifted to the position shown in FIG. 8, and the immersion cleaning chamber 610 at the lower half is substantially separated from the process chamber 630 at the upper half by using the work table as a shutter. Next, the inside of the process chamber 630 is placed in an evacuated state of $2.67\times10^3$ Pa (20 Torr) or less by evacuation via the outlet 635, whereby vacuum drying is performed for the liquid crystal panels 1.

Subsequently, after the dried liquid crystal panels 1 mounted in the cleaning basket 685 are brought out from the cleaning bath 601, other liquid crystal panels 1 are cleaned.

As described above, in the method for manufacturing the liquid crystal panel 1 of this embodiment, first, by cleaning the liquid crystal panels 1 using the hydrocarbon-based cleaning liquid containing the surfactant in the pre-cleaning step, organic and inorganic impurities adhered to the liquid crystal panel 1 are removed, and subsequently, by cleaning the liquid crystal panels 1 using the hydrocarbon-based cleaning liquid containing no surfactant in the post-cleaning step, the hydrocarbon-based cleaning liquid containing the surfactant which is adhered to the liquid crystal panels 1 is thoroughly cleaned out.

In addition, in the post-cleaning step, while the liquid crystal panels 1 are immersed in the cleaning liquid in the immersion cleaning chamber 610, since an evacuated state and a state at an atmospheric pressure are repeatedly formed in the immersion cleaning chamber 610, in the evacuated state, bubbles grow and combine with each other so as to form larger bubbles and then escape from spaces of the liquid crystal panels 1 and spaces between the liquid crystal panels 1. Accordingly, since the cleaning liquid smoothly infiltrates into the spaces, the hydrocarbon-based cleaning liquid containing the surfactant present in the spaces of the liquid crystal panels 1 or spaces between the liquid crystal panels 1 can be thoroughly replaced by the hydrocarbon-based cleaning liquid containing no surfactant. Consequently, from the liquid crystal panels 1 processed by the cleaning, organic and inorganic impurities are thoroughly removed, and the surfactant contained in the hydrocarbon-based cleaning liquid used in the pre-cleaning step does not remain.

In addition, since the hydrocarbon-based cleaning liquid containing the surfactant used in this embodiment can clean out alkaline metals generated when an inexpensive glass substrate is heated and the salts thereof formed on a surface of the substrate and can also prevent corrosion, an inexpensive soda glass can be used as at least one of a pair of substrates used for the liquid crystal panel 1.

Furthermore, in this embodiment, when immersion cleaning (ultrasonic cleaning) is performed for the liquid crystal panels 1 immersed in the cleaning liquid by applying ultrasonic vibration thereto, the cleaning liquid is cooled by the cooler 616 so as to prevent the cleaning liquid from being heated excessively by application of ultrasonic waves. As a result, deformation of the first and the second panels 10 and 20 (liquid crystal panel 1) composed of thin glass plates can be prevented. Consequently, degradation of display quality caused by movement and localization of the spacers 32 present between the substrates of the liquid crystal panel 1 does not occur.

In addition, in this embodiment, since rinsing and vacuum drying are sequentially performed for the liquid crystal panels 1, processed by the immersion cleaning, in the process chamber 630 adjacent to the immersion cleaning chamber 610 with the work table 620 (shutter) provided therebetween, the cleaning liquid does not leak outside the process chamber. Accordingly, even when a flammable hydrocarbon-based cleaning liquid is used, safety can be ensured. When the evacuation device for evacuating the inside of the process chamber 630 is operated while the shutter is open, by using this evacuation device, an evacuated state in the immersion cleaning chamber 610 and a state at an atmospheric pressure can be repeatedly formed, and vapor cleaning can be performed by evaporating the cleaning liquid in the cleaning bath 610. Consequently, there is an advantage in that only one evacuation device is required for the cleaning bath 601.

Furthermore, since vapor is generated in the distillation/recycling device 722 under an evacuated condition, even though a hydrocarbon-based cleaning liquid having a high boiling point compared to that of a fluorinated cleaning liquid is used, there is an advantage in that vapor cleaning can be easily performed.

While the cleaning is performed as described above, in the distillation/recycling portion 700, the cleaning liquid used in the cleaning bath 601 is recycled by distillation as described below.

The cleaning liquid used in the cleaning bath 601 is first stored in the control bath 701 and is then quantitatively supplied therefrom to the first-stage distillation/recycling device 721. In this distillation/recycling device 721, recycling by distillation is performed in a state in which the cleaning liquid is quantitatively supplied (a first distillation mode).

Next, after the cleaning liquid vapor generated in the first-stage distillation/recycling device 721 is liquefied by the condenser 731 communicated therewith via the discharge pipe 761 for discharging a recycled cleaning liquid and is then stored in the first-stage intermediate bath 741, the recycled cleaning liquid stored in the first-stage intermediate bath 741 is quantitatively supplied to the second-stage distillation/recycling device 722 via the supply pipe 781 for supplying a recycled cleaning liquid. In the distillation/recycling device 722, recycling by distillation is performed in a state in which the cleaning liquid is quantitatively supplied (the first distillation mode).

Next, the cleaning liquid vapor generated in the second-stage distillation/recycling device 722 is liquefied by the condenser 732 communicated therewith via the discharge pipe 762 for discharging a recycled cleaning liquid and is then stored in the second-stage intermediate bath 742.

Figure 9:
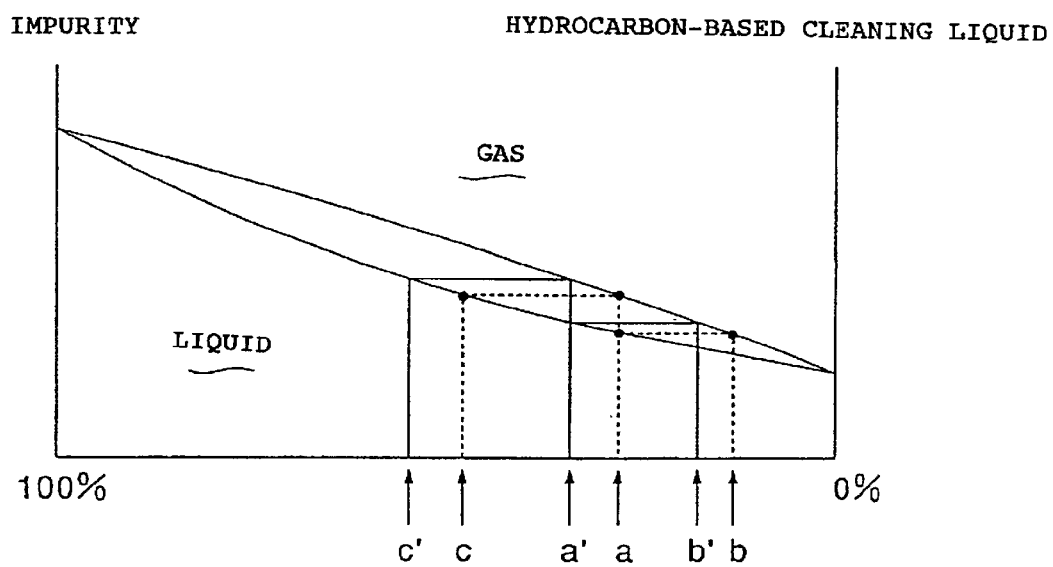
FIG. 9 is a graph showing the relationship between the boiling point and composition for illustrating an effect of using a multi-stage distillation in the cleaning apparatus provided with the distillation/recycling function shown in FIG. 4.

As described above, in the cleaning apparatus 500 of this embodiment, since the cleaning liquid used for cleaning is recycled by distillation using a plurality of distillation/recycling devices 721 and 722 communicated with each other so as to have a multi-stage structure, a normal cleaning liquid having low impurity contents can be obtained. That is, in the relationship between the boiling point and the composition shown in FIG. 9, when a cleaning liquid before recycled by distillation contains an impurity at a concentration indicated by arrow c, after the impurity concentration in the this cleaning liquid is decreased approximately to a level indicated by arrow a by the first-stage distillation/recycling device 721 (the initial stage), the cleaning liquid is then supplied to the second-stage distillation/recycling device 722. Since the cleaning liquid having an impurity at the concentration decreased approximately to a level indicated by arrow a is supplied to this second-stage distillation/recycling device 722, the impurity concentration can be decreased approximately to a level indicated by arrow b. Consequently, a recycled cleaning liquid can be obtained which is purified to a level at which rinsing can be performed.

In addition, recycled cleaning liquids having various impurity concentrations can be obtained from the individual distillation/recycling devices 721 and 722 communicated with each other so as to have a multi-stage structure. Accordingly, since a recycled cleaning liquid (a recycled cleaning liquid in the first-stage intermediate bath 741) recycled once by distillation in the distillation/recycling device 721 has a relatively high impurity concentration, the recycled cleaning liquid is used for immersion cleaning, and since a recycled cleaning liquid (a recycled cleaning liquid in the second-stage intermediate bath 742) recycled twice by distillation in the distillation/recycling devices 721 and 722 has a considerably low impurity concentration, the recycled cleaning liquid can be used for rinsing, whereby recycled cleaning liquids can be used in accordance with the impurity concentrations thereof. As a result, losses, such that a recycled cleaning liquid having a considerably low impurity concentration formed by a complicated process or the like is used for backup cleaning, will not be generated.

While the distillation operation described above is performed, when a immersion cleaning liquid is required in the cleaning bath 601, the recycled cleaning liquid stored in the first-stage intermediate bath 741 is supplied to the cleaning bath 601 via the supply pipe 782 for supplying an immersion cleaning liquid. In addition, when an immersion cleaning liquid is required in the cleaning bath 601, the recycled cleaning liquid stored in the second-stage intermediate bath 742 may be supplied to the cleaning bath 601 via the supply pipe 750 for supplying an immersion cleaning liquid. Furthermore, when a shower cleaning liquid is required in the cleaning bath 601, the recycled cleaning liquid stored in the second-stage intermediate bath 742 is supplied to the cleaning bath 601 via the supply pipe 752 for supplying a shower cleaning liquid. In addition, when cleaning liquid vapor is required for vapor cleaning in the cleaning bath 601, cleaning liquid vapor generated in the second-stage distillation/recycling device 722 is supplied to the cleaning bath 601 via the vapor supply pipe 756 for supplying cleaning liquid vapor.

In this connection, when recycling by distillation is successively performed, impurity concentrations of the cleaning liquids in the distillation/recycling devices 721 and 722 are increased. In general, recycling by distillation is performed by quantitatively supplying a cleaning liquid to the individual distillation/recycling devices 721 and 722 (the first distillation mode); however, when impurity concentrations of cleaning liquids in the distillation/recycling devices 721 and 722 or impurity concentrations of cleaning liquids discharged therefrom are increased as shown by arrows c', a', and b' shown in FIG. 9, or when an increase in impurity concentration is estimated, an operation called a boiling operation for decreasing the impurities is performed (a second distillation mode).

This boiling operation is performed by steps of stopping quantitative supply of cleaning liquids to the distillation/recycling devices 721 and 722 and subsequently recycling cleaning liquids stored in the distillation/recycling devices 721 and 722 by distillation (the second distillation mode). Next, after a certain amount of a cleaning liquid is recovered, recycling by distillation is stopped, and cleaning liquids remaining in the distillation/recycling devices 721 and 722 are discarded together with residues (impurities) in receiving baths 791 and 792. Subsequently, by quantitatively supplying cleaning liquids to the distillation/recycling devices 721 and 722, recycling of the cleaning liquids by distillation are again performed. Accordingly, since impurities in the distillation/recycling devices 721 and 722 can be effectively discarded, the impurity concentration of recycled cleaning liquid can be controlled to be low.

In the embodiment described above, immersion cleaning is performed in the pre-cleaning step, and immersion cleaning, shower cleaning, and vapor cleaning are performed in the post-cleaning step; however, in the case in which only immersion cleaning is performed in both pre-cleaning and post-cleaning, superior cleaning can be performed as long as the present invention is applied thereto.

Figure 10:
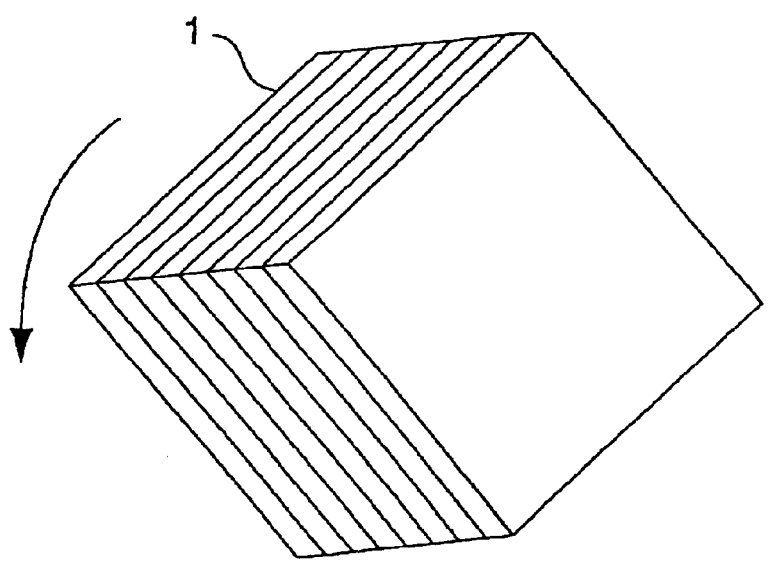
FIG. 10 is a view for illustrating a state in which liquid crystal panels are brought out in a cleaning method according to another embodiment of the present invention.

In addition, in the pre-cleaning step and/or the post-cleaning step, as shown in FIG. 10, when the liquid crystal panels 1 are brought out form the cleaning liquid, the liquid crystal panels 1 are preferably inclined so that the side members thereof are inclined. When the liquid crystal panels 1 are brought out in a manner as described above, a cleaning liquid, which normally does not flow out, flows out from the spaces of the liquid crystal panels 1 and spaces between the liquid crystal panels 1. Accordingly, when the method described above is applied to the pre-cleaning step, the amount of a cleaning liquid containing a surfactant adhered to the liquid crystal panels 1, which is used in the pre-cleaning, can be significantly decreased when the liquid crystal panels 1 are transferred to the post-cleaning step. Consequently, in the post-cleaning step, the cleaning liquid containing the surfactant adhered to the liquid crystal panels 1 can be thoroughly replaced by the cleaning liquid containing no surfactant. In addition, when the method described above is applied to the post-cleaning step, in accordance with a significant decreased in amount of the cleaning liquid adhered to the liquid crystal panels 1, drying time can be decreased.

Figure 11:
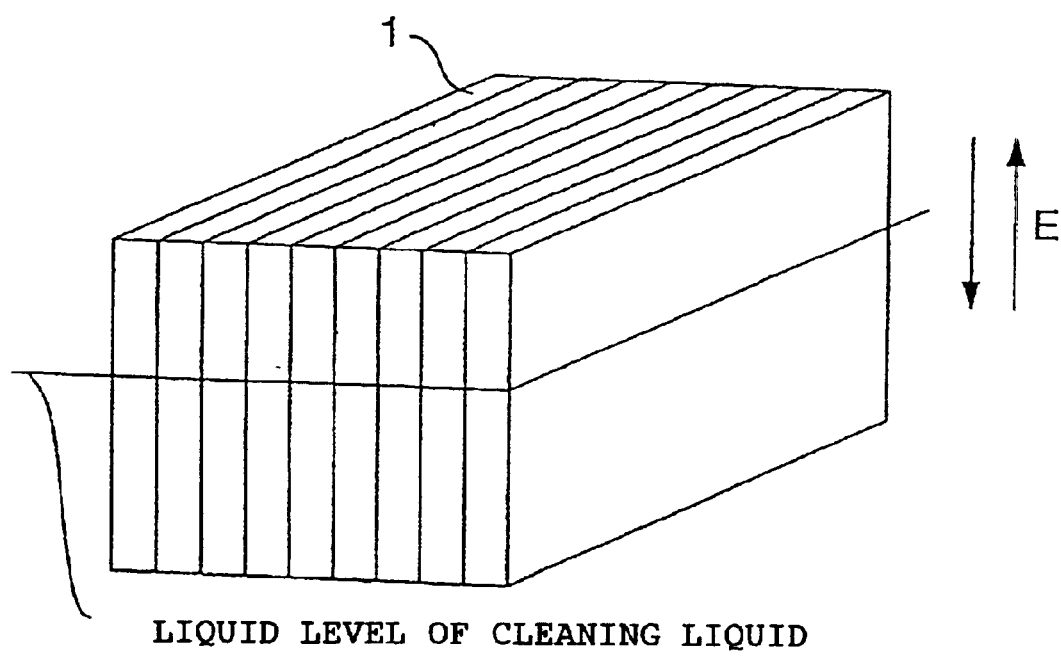
FIG. 11 is a view for illustrating a state in which liquid crystal panels are brought out by another way in a cleaning method according to another embodiment of the present invention.

In addition, in the pre-cleaning step and/or the post-cleaning step, as shown in FIG. 11, when the liquid crystal panels 1 are brought out form the cleaning liquid, the liquid crystal panels 1 are preferably moved up and down at the liquid level of the cleaning liquid as shown by arrow E. When the method described above is employed, a polluted cleaning liquid present in the spaces of the liquid crystal panels 1 and spaces between the liquid crystal panels 1 can be reliably replaced by the cleaning liquid stored in the cleaning bath. Accordingly, when the method described above is applied to the pre-cleaning step, liquid crystal panels 1 having a large amount of a polluted cleaning liquid adhered thereto is prevented from being transferred to the post-cleaning step. In addition, when the method described above is applied to the post-cleaning step, a drying treatment for the liquid crystal panels 1 having a large amount of a polluted cleaning liquid adhered thereto can be prevented.

Furthermore, between the pre-cleaning step and the post-cleaning step, a drying step of, for example, blowing a hot wind to the liquid crystal panels 1 is preferably performed. When the cleaning is performed as described above, after the cleaning liquid present in spaces of the liquid crystal panels 1 and spaces therebetween is removed, the liquid crystal panels 1 can be transferred to the post-cleaning step. As a result, a cleaning liquid smoothly infiltrates into the spaces of the liquid crystal panels 1 and the spaces therebetween, and hence, the post-cleaning can be preferably performed.

As has thus been described, in the present invention, after organic and inorganic impurities adhered to the work are removed by cleaning using the hydrocarbon-based cleaning liquid containing the surfactant, cleaning is performed using the hydrocarbon-based containing no surfactant, and the hydrocarbon-based cleaning liquid containing the surfactant adhered to the work is thoroughly cleaned out. In addition, in the post-cleaning step, since the operation of evacuating the inside of the cleaning bath and the operation of exposing the inside thereof to air are repeatedly performed, bubbles in the spaces of the works and spaces therebetween grow and combine with each other during evacuation so as to form larger bubbles, and they escape from the spaces. Consequently, the cleaning liquid smoothly infiltrates into the spaces. Accordingly, the hydrocarbon-based cleaning liquid containing the surfactant present in the spaces can be thoroughly replaced by the hydrocarbon-based cleaning liquid containing no surfactant. Hence, after the cleaning is performed, organic and inorganic impurities can be thoroughly removed from the work, and the surfactant contained in the cleaning liquid used in the pre-cleaning liquid does not remain thereon.

Furthermore, by using the cleaning method of the present invention, in addition to the improvement of the cleaning effect, since a number of liquid crystal panels can be simultaneously processed, manufacturing time and cost can be decreased.

What is claimed is:

1. A cleaning method comprising:
    a pre-cleaning step of performing at least immersion cleaning for a work using a hydrocarbon-based cleaning liquid containing a surfactant in a first bath; and
    a post-cleaning step of performing at least immersion cleaning for the work processed in the pre-cleaning step using a hydrocarbon-based cleaning liquid containing no surfactant in a second bath;
    wherein, in the post-cleaning step, an operation of evacuating the inside of the second bath and an operation of exposing an interior of the second bath to atmospheric pressure are repeatedly performed while the work is being immersed in the hydrocarbon-based cleaning liquid of the second bath.

2. The cleaning method according to claim 1 further including the step of inclining the work relative to a surface of the cleaning liquid in at least one of the pro-cleaning step and the post-cleaning step.

3. The cleaning method according to claim 1 further including the step of moving the work up and down within the cleaning liquid during at least one of the pre-cleaning step and the post-cleaning step.

4. The cleaning method according to claim 1, further comprising a step of drying the work between the pre-cleaning step and the post-cleaning step.

5. The cleaning method according to claim 1, wherein the work comprises a liquid crystal panel.

6. The cleaning method according to claim 5, wherein the liquid crystal panels are placed adjacent to each other in the first and second baths.

7. A cleaning method comprising:
    a pre-cleaning step including immersing an object to be cleaned in a first bath having a hydrocarbon based cleaning liquid containing a surfactant and
    a post-cleaning step including immersing the object to be cleaned from the pre-cleaning step in a second bath containing a hydrocarbon-based cleaning liquid containing no surfactant while repeatedly changing a pressure from atmospheric pressure to a reduced state of about 50 to 100 torr and back to atmospheric pressure in the second bath.

* * * * *

UNITED STATES PATENT AND TRADEMARK OFFICE
CERTIFICATE OF CORRECTION

PATENT NO.    : 6,776,853 B2  
DATED         : August 17, 2004  
INVENTOR(S)   : Yoichi Ono et al.

Page 1 of 1

It is certified that error appears in the above-identified patent and that said Letters Patent is hereby corrected as shown below:

<u>Column 14,</u>
Line 37, "pro-cleaning" should be -- pre-cleaning --

Signed and Sealed this

Nineteenth Day of July, 2005

JON W. DUDAS
*Director of the United States Patent and Trademark Office*